(12) United States Patent
Kearney

(10) Patent No.: US 8,233,602 B2
(45) Date of Patent: Jul. 31, 2012

(54) AUTHENTICATION APPARATUS

(75) Inventor: Paul J Kearney, Felixstowe (GB)

(73) Assignee: BRITISH TELECOMMUNICATONS public limited company, London (GB)

( * ) Notice: Subject to any disclaimer, the term of this patent is extended or adjusted under 35 U.S.C. 154(b) by 1199 days.

(21) Appl. No.: 11/988,933

(22) PCT Filed: Jul. 21, 2006

(86) PCT No.: PCT/GB2006/002757
§ 371 (c)(1),
(2), (4) Date: Jan. 17, 2008

(87) PCT Pub. No.: WO2007/012831
PCT Pub. Date: Feb. 1, 2007

(65) Prior Publication Data
US 2009/0122970 A1 May 14, 2009

(30) Foreign Application Priority Data
Jul. 29, 2005 (GB) .................................. 0515708.6

(51) Int. Cl.
*H04M 1/60* (2006.01)
*H04M 9/00* (2006.01)
(52) U.S. Cl. ............. 379/167.11; 379/93.02; 379/93.03; 379/167.05; 379/167.06; 379/167.07
(58) Field of Classification Search ............... 379/88.02, 379/88.19, 93.01, 93.02, 167.05, 167.06, 379/167.08, 167.11, 167.14, 355.02, 355.03, 379/355.09; 704/246, 247, 273, 275
See application file for complete search history.

(56) References Cited

U.S. PATENT DOCUMENTS

| 4,764,953 A | * | 8/1988 | Chern et al. ............. 379/355.01 |
| 5,303,300 A | | 4/1994 | Eckstein |
| 6,161,090 A | * | 12/2000 | Kanevsky et al. ............. 704/246 |
| 7,085,361 B2 | * | 8/2006 | Thomas .................... 379/167.01 |

(Continued)

FOREIGN PATENT DOCUMENTS
WO    WO 95/08891    3/1995
(Continued)

OTHER PUBLICATIONS

International Search Report for PCT/GB2006/002757, mailed Oct. 10, 2006.

(Continued)

*Primary Examiner* — Binh Tieu
(74) *Attorney, Agent, or Firm* — Nixon & Vanderhye P.C.

(57) ABSTRACT

An authentication device for fitting at the entrance to a property includes an externally facing interface including a speaker and a microphone; an internally facing interface comprising a speaker, a microphone and a keypad; and a processing unit including electrical interfaces to both the internally and externally facing interfaces and to a telephone unit. The internally facing keypad includes a button which permits a user to cause the processing unit to initiate a call using the telephone unit to a remote voice verification center via the telephone unit and the PSTN to which it is interfaced when in use (via standard telephone socket). The processing unit is additionally operable to communicate audio signals between the remote voice verification center and at least the externally facing interface (i.e. the speaker and microphone thereof), whereby a visitor may be remotely verified by the remote voice verification center before the householder grants the visitor admission to the property.

8 Claims, 4 Drawing Sheets

U.S. PATENT DOCUMENTS

| | | | | |
|---|---|---|---|---|
| 2002/0094067 A1* | 7/2002 | August | ...................... | 379/88.01 |
| 2004/0078340 A1* | 4/2004 | Evans | ............................. | 705/64 |
| 2004/0179666 A1* | 9/2004 | Milton | ..................... | 379/201.02 |
| 2004/0229569 A1 | 11/2004 | Franz | | |
| 2006/0126806 A1* | 6/2006 | Trandal et al. | ............. | 379/88.26 |

FOREIGN PATENT DOCUMENTS

| | | |
|---|---|---|
| WO | WO 95/23391 | 8/1995 |

OTHER PUBLICATIONS

UK Search Report dated Aug. 22, 2005 in Application No. GB0515708.6.

Written Opinion of the International Searching Authority mailed Oct. 10, 2006 in Application No. PCT/GB2006/002757.

\* cited by examiner

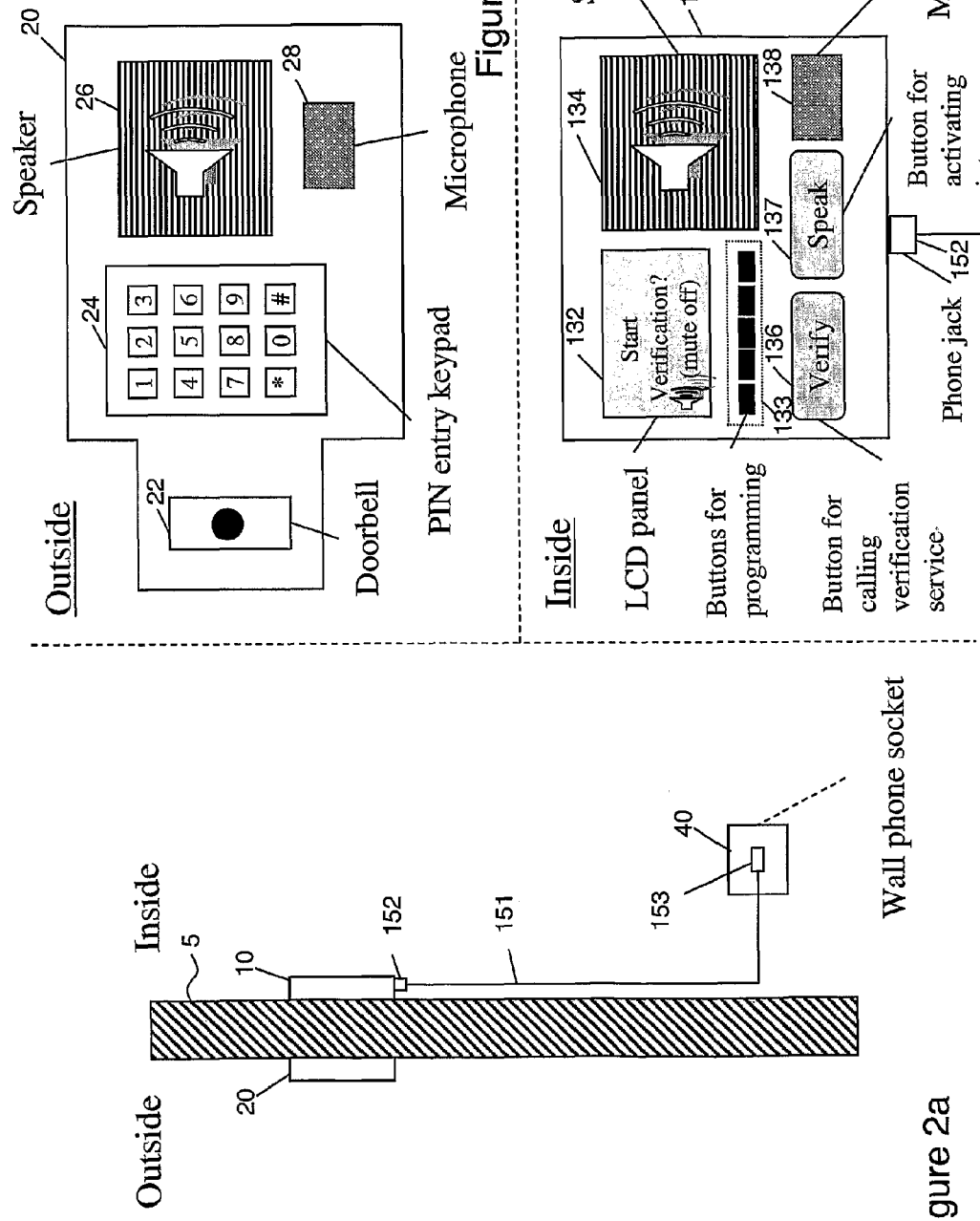

AUTHENTICATION APPARATUS

This application is the U.S. national phase of International Application No. PCT/GB2006/002757, filed 21 Jul. 2006, which designated the U.S. and claims priority to Great Britain Application No. 0515708.6, filed 29 Jul. 2005, the entire contents of each of which are hereby incorporated by reference.

TECHNICAL FIELD

The present invention relates to an authentication method and apparatus. In particular, it relates to a method and apparatus for authenticating a visitor to a property which is inexpensive, convenient and very easy to operate.

BACKGROUND

There is an increasing need to allow old and/or vulnerable home dwellers to authenticate legitimate tradespersons or professional careworkers or helpers before allowing them access to their homes, to guard against the possibility of intruders deceiving the homeowner into letting them into their property under false pretences.

As would-be intruders become more sophisticated in their means of deception, methods such as requiring the visitor to display some form of identification is increasingly being seen as insufficient evidence on which to allow the visitor entry. As an additional form of authentication, most legitimate representatives of service companies will provide a telephone number of the organisation of which they are a representative, so that the householder may contact the organisation and verify the identity of the representative. However, this system is somewhat cumbersome to implement in practice and is not completely secure. (How does the househoulder know that the phone number is correct? How can the householder be sure that it is not an imposter who has stolen the legitimate representative's ID, etc.)

SUMMARY OF THE INVENTION

According to a first aspect of the present invention, there is provided an authentication device for fitting at the entrance to a property comprising: an externally facing interface comprising a speaker and a microphone; an internally facing interface comprising a speaker, a microphone and a keypad; and a processing unit including electrical interfaces to both the internally and externally facing interfaces and to telephone equipment, wherein the internally facing keypad includes a button or buttons which permit a user to cause the processing unit to initiate a call to a remote voice verification centre via the telephone equipment to which it is interfaced when in use, and wherein the processing unit is operable to communicate audio signals between the remote voice verification centre and at least the externally facing speaker and microphone, whereby a visitor may be remotely verified by the remote voice verification centre.

Preferably, the externally facing interface includes a keypad including at least a bell button for alerting a householder inside the property to the presence of the visitor and preferably also includes a set of number keys to permit the visitor to input additional identification or verification information such as a Personal Identification Number (PIN) for use with the remote voice verification centre.

Preferably the internally facing interface includes a screen such as a Liquid Crystal Display (LCD) screen for providing visual feedback to the user as to the progress of a remote voice verification.

BRIEF DESCRIPTION OF THE FIGURES

In order that the present invention may be better understood, embodiments thereof will now be described, by way of example only, with reference to the accompanying drawings in which:

FIG. 2*a* is a schematic illustration of a possible arrangement of the apparatus of FIG. 1;

FIGS. 2*b* and 2*c* schematically illustrate in greater detail the externally and internally facing interfaces respectively of the authentication apparatus of FIG. 1.

DETAILED DESCRIPTION OF A FIRST EMBODIMENT

Figure 1:
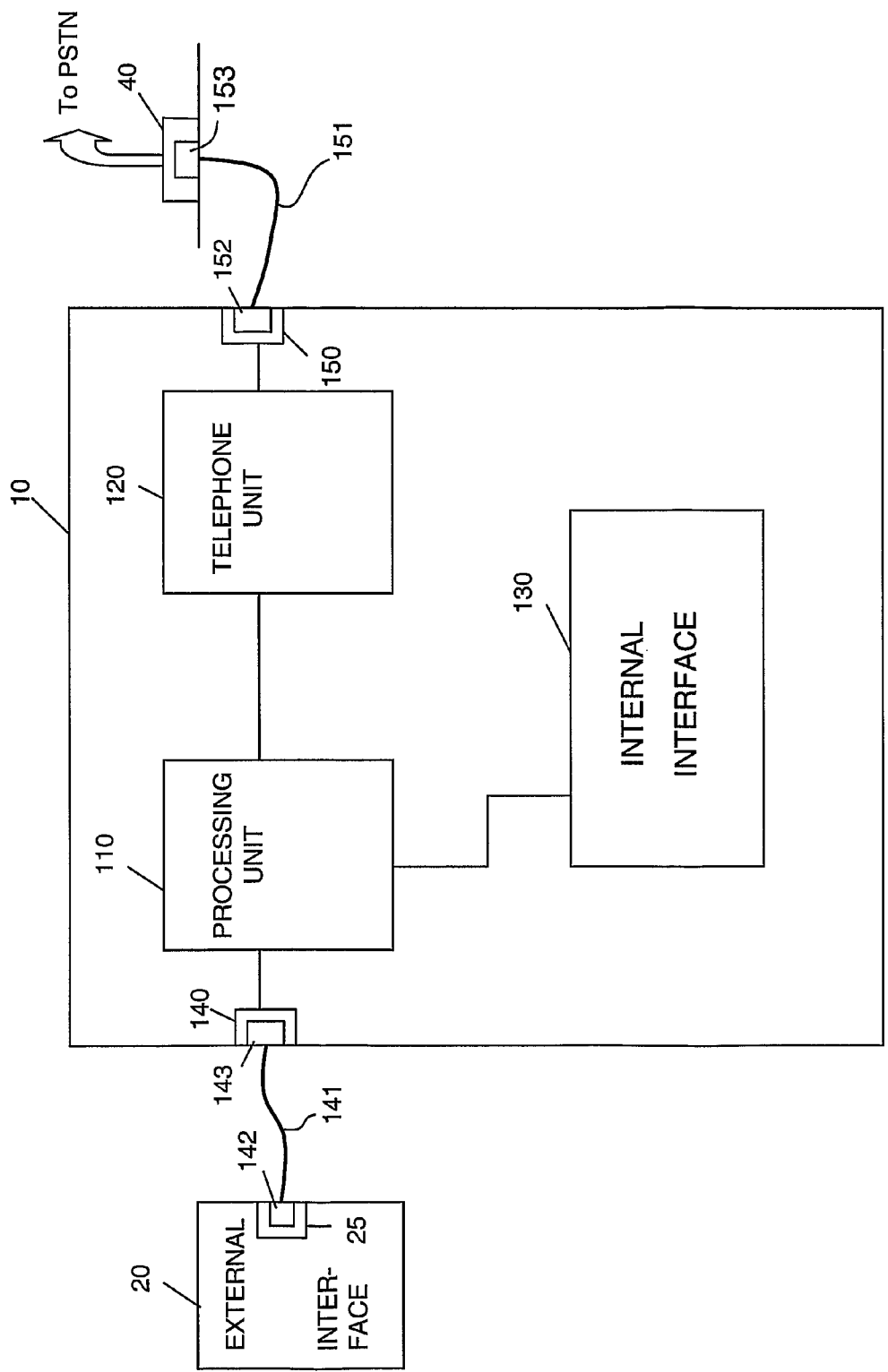
FIG. 1 is a schematic block diagram illustrating an authentication apparatus according to one embodiment of the present invention.

Referring now to FIG. 1, the authentication apparatus of a first embodiment comprises a main portion 10; an external interface 20; a connector 141 between the main portion 10 and the external interface 20; and a connector 151 connecting the main portion 10 to a telephone socket 40 within the house. For convenience, the main body 10 includes standard telephone port sockets 140, 150 (which may vary from country to country) corresponding to the telephone socket 40 within the house such that standard telephone wires 141, 151 having standard jacks/plugs 142, 143, 152, 153 (e.g. RJ11 plugs in the UK) may be used.

The main portion 10, in the present embodiment, includes a processing unit 110, a telephone unit 120, an internal interface 130, and first and second telephone port sockets 140, 150 for connection to the external interface 20 and the telephone socket 40 (which is in turn connected to the PSTN) respectively.

In use, the processing unit 110 is operable to control the flow of audio signals between the external and internal interfaces and remote services or telephones contactable via the telephone unit 120 and the PSTN, especially a remote voice verification service such as the URU service provided by British Telecommunications PLC in the UK. The steps taken by the processing unit during normal operation are described in greater detail below with reference to the FIG. 3.

Referring now to FIG. 2*a*, in the present example arrangement, the main portion 10 is mounted on the inside of an external wall 5 of the property near to the main entrance to the property, whilst the external interface is mounted on the outside of the external wall 5. the telephone lead 151 is shown connected between the port 150 of the main portion and the wall mounted phone socket 40 which provides a connection to the PSTN.

Referring now to FIG. 2*b*, the external interface in the present example is seen to include a door bell 22 for attracting the attention of the householder to the presence of a visitor (in the present embodiment pressing the doorbell 22 causes an audible tone to be generated by the speaker 34 on the internal interface), a keypad 24 (which in the present embodiment is of the standard type used in push button telephones, including the ten digit keys "1"-"9" and "0", a hash "#" key and a star "*" key in the conventional format for such keys so as to permit a standard Dual Tone Multi-Frequency (DTMF) generator unit to be used for passing information about buttons pushed to the processing unit 110 within the main portion 10. The external interface 20 also includes a speaker 26 and microphone 28. Naturally, the external interface 20 additionally includes circuitry, for controlling the various components described above, such as a DTMF generator, amplifiers, etc.

FIG. 2c shows the internal interface 130. The internal interface 130 includes an LCD display 132, a keypad 133, a speaker 134, a "VERIFY" button 136, a "SPEAK" button 137 and a microphone 138. The LCD display is used to provide visual feedback to the user; in the present embodiment it is used to assist the user in programming the functionality of the device, and to provide a visual indication of the current status of the device, etc. The keypad is used to program the device. In the present invention, it is set up when initially installed with a pre-programmed telephone number of the remote verification service and no further user set-up is required. However it is possible for the user, or a service engineer, to access various features to change various settings etc. using this keyboard. Additionally, the display is capable of showing the present date and time and this may be set and adjusted using the buttons 133.

The "SPEAK" button 137 is operable to initiate a voice communication link between the internal and external interfaces so that the house holder may converse with the visitor. In the present embodiment, the "SPEAK" button causes the device to toggle between two modes, hereinafter referred to as a SPEAK mode and a MUTE mode. In the SPEAK mode the external loudspeaker will relay to the visitor any audio signals coming from either the householder via the internal microphone 138 or from a remote centre such as the remote verification service via the PSTN and the telephone unit 120. In the MUTE mode, no audio signals are relayed to the external speaker 26 either from the internal microphone 138 or from the telephone unit 120, therefore in this mode the householder may converse either with another householder or with a person at the end of the telephone connection (e.g. at the remote verification service). In the default mode the internal speaker always relays sounds coming either from outside via the external microphone or from the telephone unit, although this can be changed so that in mute mode the speaker does not relay sounds picked up by the external microphone. Note that in alternative embodiments, more options could be provided to control which signals are relayed to which speakers etc.

The "VERIFY" button 136 is operable to initiate a telephone call to the remote verification centre. Provided the apparatus is in the SPEAK mode, the visitor (as well as the householder) will hear the progress of the call and will be able to respond to any automatic requests (e.g. to enter PIN numbers and to utter a pass-phrase, etc.). The householder will also hear all of this, regardless of whether the apparatus is in SPEAK or MUTE mode, and in addition will be informed of the progress of the call (e.g. "CONNECTING . . . " "CONNECTED", etc.) via the display panel 132. In order to initiate the telephone call, the processing unit instructs the telephone unit to establish the connection using a pre-stored telephone number. As mentioned above, in the present embodiment, this number is pre-stored in the processing unit's memory by the factory. However, it is nonetheless possible to change the telephone number if necessary using the programming buttons 133.

Note that in the present embodiment the device is powered using the power from the PSTN (this is done in a conventional way within the telephone unit 120) via socket 40. However, in alternative embodiments a separate power supply could be used either requiring batteries or for attachment to the mains power supply as is commonplace with many modern telephones requiring more power than can be obtained from the PSTN.

Figure 3A:
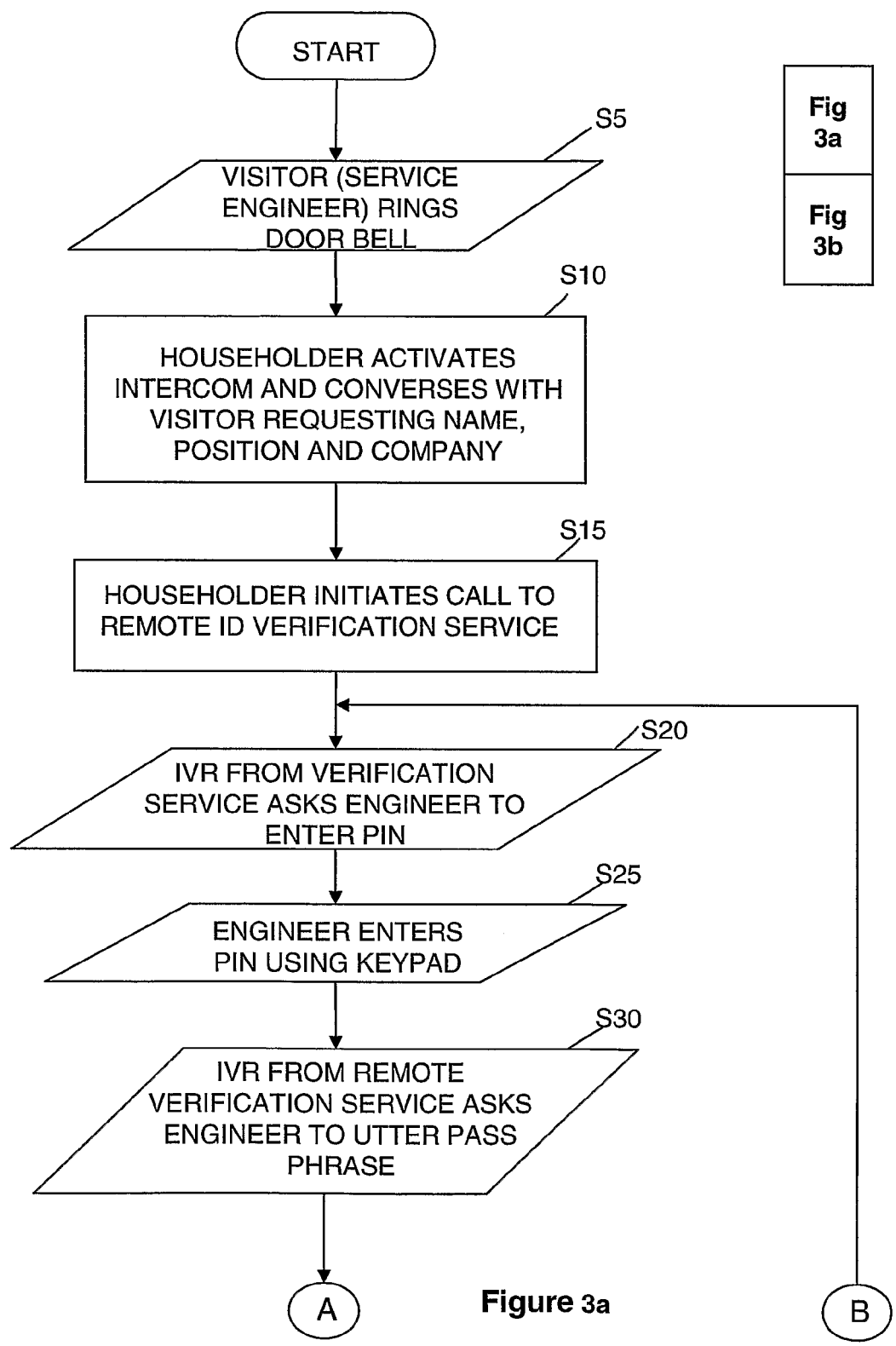
FIG. 3 is a flow chart illustrating the steps carried out in authenticating a service engineer using the authentication apparatus of FIGS. 1 and 2.
Figure 3B:
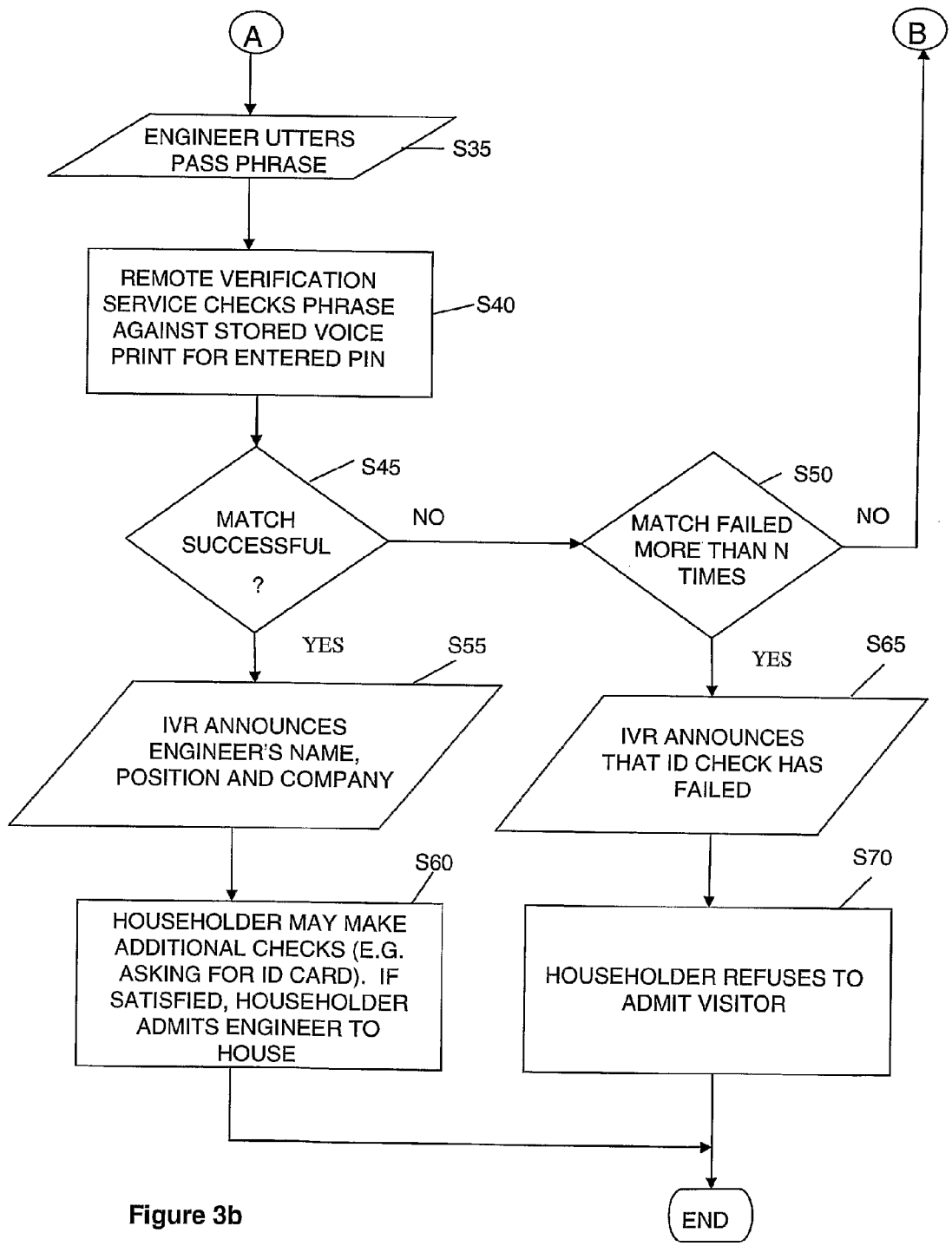

Referring now to FIG. 3, the steps performed when a householder attempts to authenticate a visitor using the apparatus of the present embodiment are now described. When the visitor (in this example a service engineer) arrives at the main entrance to the property he presses the door bell 22 to alert the householder to his presence (step S5). Upon hearing the doorbell, the householder approaches the internal interface 130 and presses the "Speak" button 137 to place the apparatus into the SPEAK mode (step S10); the householder is then able to converse with the visitor and does so to establish who (he says) he is, and the stated purpose of his visit; the householder may then ask the visitor to undergo remote authentication before he will be admitted to the property.

Assuming that the visitor consents to this, the householder then presses the "Verify" button 136 to initiate a call to the remote authentication centre (step S15). As mentioned above, this causes the telephone unit to dial a stored number. Once the call is established, the remote call centre, in the present example, the call centre employs an Interactive Voice Response (IVR) system which immediately on answering the call asks the caller to enter an IDentification (ID) Personal Identification Number (PIN) (step S20).

The visitor then enters his ID PIN using the DTMF keypad 24 (step S25). The audio signals thereby generated are transmitted to the IVR system which decodes these to recover the entered ID PIN and requests that the visitor utter his predetermined pass phrase (step S30). The pass phrase is a pre-set phrase which the visitor must have previously registered with the remote authentication service. The remote authentication service ensures that this initial registration is done in a manner which gives a very high level of confidence that the person registering is who he (or she) says he (or she) is. The visitor then utters his pass phrase as requested (step S35).

Having now received from the visitor both the visitor's ID PIN and the uttered pass phrase, the remote authentication system checks the voice print of the uttered phrase against the voice print corresponding to the entered PIN in a database of stored voice prints maintained by the remote voice verification service (step S40). The system determines if there is a match (step S45). If it is determined that the voice prints do not match, then the system (in the present embodiment) checks (step S50) to see if the number of times that such a failure to recognise a match has happened exceeds a predetermined number N (e.g. 2); if not, then the method returns to step S20 and the IVR again asks the visitor to enter his ID PIN and utter his pass phrase, etc. If, however, it is determined that the maximum permitted number of failures has been exceeded, then the IVR of the remote verification service announces that the ID check has failed (step S65), and naturally the householder then refuses to allow the visitor admission to the property (step S70) and the method ends.

Alternatively, if at step S45 it is determined that the voice print match in respect of the entered PIN was successful, then the IVR announces that the authentication has been successful and gives the visitor's name, the name of his employer (i.e. the company name) and his position (within the company) (step S55). At this point the householder may still make additional checks such as requesting to see an ID card. If satisfied, the householder may then allow the visitor to enter the property to carry out his business (step S60).

Alternatives

It will be apparent that a large number of alternative arrangements could be made to the embodiment described above whilst still falling within the scope of the appended claims. For example, instead of using a wired connection between the external interface and the main portion, a wireless connection (for example DECT or Bluetooth) could be used instead. Furthermore, the internal interface could be formed by a conventional telephone, reconfigured by way of its operating software to provide the functionality of allowing a voice connection to be made either to the external interface (e.g. via a DECT or other interface such as some sort of wireless interface or a wired interface), or to the remote voice verification centre, or between the external interface and the remote voice verification centre. However, it is preferable to have a simplified interface so that when the telephone is operating as an authentication tool, the procedures for contacting the remote voice verification centre and connecting it through to the external interface is made as straightforward as possible, preferably requiring the user to press only one or two buttons to make the call and to cut off and/or patch in the external interface as desired. This could optimally be achieved using "soft keys" i.e. keys whose functionality depends upon the state of the telephone, usually with an indication given by the display as to the current function performed by pressing the "soft key".

Instead of the main portion including a telephone unit, it could include circuitry which enables it to interface with a separate telephone modified to permit it to be connected to and controlled by the main portion.

The apparatus could be incorporated into an entry-phone system for servicing a property having a shared main entrance for multiple homes (e.g. flats, apartments, etc.).

In a very basic embodiment, the external interface could do away with everything apart from the speaker and the microphone and any requirement to enter a PIN could be satisfied by having the remote voice verification system use voice recognition such that the user can utter his or her PIN. Similarly, in a very basic embodiment, the internal interface could dispense with everything apart from the speaker and the microphone and some form of actuation means such as the "Verify" button to permit the user to cause the device to initiate a telephone call to the remote verification service using a pre-stored telephone number.

The microphone and speaker at both the internal and external interfaces may be formed within a handset such as that typically found in a conventional telephone; this has the advantage of minimising the amount of power required to operate the speakers (since they are small and placed very close to the ear in such an arrangement) thus enabling the power from the PSTN to be used to power the device with ease, as well as providing a clear input signal for processing by the remote voice verification centre.

The invention claimed is:

1. An authentication device for fitting at the entrance to a property, the device comprising:
   an external interface comprising a speaker and a microphone;
   an internal interface comprising a speaker, a microphone and actuation unit; and
   a processing unit connected to both the internal and external interfaces and operably connected to telephone equipment,
   wherein, the actuation unit is configured to permit a user to cause the processing unit to initiate a call to a remote voice verification centre via the telephone equipment to which it is connected, and
   wherein the processing unit is configured to communicate audio signals between the remote voice verification centre, the external interface and the internal interface,
   whereby a visitor may be remotely verified by the remote voice verification centre, in such a manner that the user and the visitor may hear the progress of the verification call.

2. A device according to claim 1 wherein the external interface includes a keypad.

3. A device according to claim 2 wherein the keypad includes buttons for entering a personal identification number.

4. A device according to claim 1 wherein the device includes a telephone unit which is configured to initiate a telephone connection to the remote voice verification centre when connected to a PSTN.

5. A method of authenticating a visitor arriving at an entrance to a property using an authentication device including: an external interface comprising a speaker and a microphone; an internal interface comprising a speaker, a microphone and actuation unit; and a processing unit operably coupled to both the internal and external interfaces and to telephone equipment, the method comprising:
   operating the actuation unit to permit a user to cause the processing unit to initiate a call to a remote voice verification center via the telephone equipment to which it is operably coupled;
   receiving an utterance from the user in the external interface;
   operating the processing unit to communicate audio signals between the remote voice verification center, the external interface and the internal interface, whereby the visitor may be remotely authenticated by the remote voice verification center, in such a manner that the user and the visitor may hear the progress of the verification call;
   comparing, by the remote voice verification center, the voice print of the uttered phrase with a stored voice print; and
   authenticating the visitor or not in dependence upon the results of the comparison.

6. The method claim 5 wherein the external interface includes a keypad.

7. The method claim 6 wherein the keypad includes buttons for entering a personal identification number.

8. The method claim 5 further comprising operating the telephone unit to initiate a telephone connection to the remote voice verification center when connected to a PSTN.

* * * * *